United States Patent
Ma et al.

(10) Patent No.: US 11,570,854 B2
(45) Date of Patent: Jan. 31, 2023

(54) MIST REMOVING DEVICE, CONTROLLING METHOD THEREOF, MIST REMOVING SYSTEM AND CONTROL ELEMENT

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chuanhui Ma, Beijing (CN); Yong Song, Beijing (CN); Jun Long, Beijing (CN); Gang Yang, Beijing (CN); Tianyu Xu, Beijing (CN); Weipeng Han, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 445 days.

(21) Appl. No.: 16/622,787

(22) PCT Filed: Mar. 26, 2019

(86) PCT No.: PCT/CN2019/079634
§ 371 (c)(1),
(2) Date: Dec. 13, 2019

(87) PCT Pub. No.: WO2019/201061
PCT Pub. Date: Oct. 24, 2019

(65) Prior Publication Data
US 2020/0154527 A1 May 14, 2020

(30) Foreign Application Priority Data
Apr. 17, 2018 (CN) ............. 201810343824.7

(51) Int. Cl.
*H05B 3/86* (2006.01)
*B60S 1/02* (2006.01)

(52) U.S. Cl.
CPC ............ *H05B 3/86* (2013.01); *B60S 1/026* (2013.01); *H05B 2203/002* (2013.01); *H05B 2203/035* (2013.01)

(58) Field of Classification Search
CPC ...... H05B 3/86; H05B 3/84; H05B 2203/002; H05B 2203/035; H05B 2203/031; H05B 1/0236; H05B 2214/02; B60S 1/026; B60S 1/60
See application file for complete search history.

(56) References Cited

U.S. PATENT DOCUMENTS

2008/0107542 A1* 5/2008 Hernandez ............ B08B 17/02
417/48
2018/0095067 A1* 4/2018 Huff ................ G01N 33/48721

FOREIGN PATENT DOCUMENTS

CN 2875599 Y 3/2007
CN 101078708 A 11/2007
(Continued)

OTHER PUBLICATIONS

Second Office Action for Chinese Application No. 201810343824.7, dated Feb. 25, 2020, 7 Pages.
(Continued)

*Primary Examiner* — Shawntina T Fuqua
(74) *Attorney, Agent, or Firm* — Brooks Kushman P.C.

(57) ABSTRACT

A mist removing device, a controlling method thereof a mist removing system and a control element are provided, which relate to the field of mist removing technology. The mist removing device includes power supply module, electrode array and insulating layer. Electrode array and insulating layer are arranged on substrate in stacked manner in direction away from substrate. Orthographic projection of insulating layer onto substrate covers orthographic projection of (Continued)

electrode array onto substrate. Power supply module is connected with electrode array. Power supply module is configured to supply power to electrode array such that electrode array forms electric field to cause droplets in mist to converge under action of electric field, where mist is formed on side of insulating layer away from substrate. Mist on surface of substrate can be effectively removed.

20 Claims, 6 Drawing Sheets

(56) References Cited

FOREIGN PATENT DOCUMENTS

| | | | | | |
|---|---|---|---|---|---|
| CN | 102156367 A | * | 8/2011 | ....... G02F 1/134363 |
| CN | 102671765 A | | 9/2012 | |
| CN | 205392746 U | | 7/2016 | |
| CN | 205546005 U | | 8/2016 | |
| CN | 106364288 A | | 2/2017 | |
| CN | 108501872 A | | 9/2018 | |
| CN | 108909675 B | * | 8/2021 | ............. B60S 1/026 |
| EP | 2522554 A1 | | 11/2012 | |
| JP | S63271319 A | | 11/1988 | |
| JP | 2008041343 A | | 2/2008 | |
| KR | 101166542 B1 | | 7/2012 | |

OTHER PUBLICATIONS

International Search Report and Written Opinion for Application No. PCT/CN2019/079634, dated Jun. 28, 2019, 11 Pages.

Third Office Action for Chinese Application No. 201810343824.7, dated Nov. 4, 2020, 7 Pages.

* cited by examiner

MIST REMOVING DEVICE, CONTROLLING METHOD THEREOF, MIST REMOVING SYSTEM AND CONTROL ELEMENT

CROSS-REFERENCE TO RELATED APPLICATIONS

This application is the U.S. national phase of PCT Application No. PCT/CN2019/079634 filed on Mar. 26, 2019, which claims priority to Chinese Patent Application No. 201810343824.7 filed on Apr. 17, 2018, which are incorporated herein by reference in their entireties.

TECHNICAL FIELD

The present disclosure relates to the field of mist removing technology, in particular to a mist removing device, a method of controlling a mist removing device, a mist removing system and a control element.

BACKGROUND

With the development of technology, application of glass products has become increasingly wide. For example, the glass products can be used as windshield and rearview mirror for automobiles. Due to a temperature difference between the inside and the outside of the automobile, droplets tend to be collected on a surface of the windshield of automobile to form a mist. The mist may affect a sight line of a driver, which results in a great security risk.

SUMMARY

A mist removing device, a method of controlling a mist removing device, a mist removing system and a control element are provided according to the present disclosure In an aspect, a mist removing device is provided. The mist removing device includes:

a power supply module, an electrode array and an insulating layer, where the electrode array and the insulating layer are arranged on a substrate in a stacked manner in a direction away from the substrate, an orthographic projection of the insulating layer onto the substrate covers an orthographic projection of the electrode array onto the substrate, and the power supply module is connected with the electrode array;

the power supply module is configured to supply power to the electrode array such that the electrode array forms an electric field to cause droplets in a mist to converge under action of the electric field, where the mist is formed on a side of the insulating layer away from the substrate.

Optionally, the electrode array includes at least two strip-like electrodes spaced apart from each other in a target direction, and a length extension direction of the strip-like electrode is perpendicular to the target direction. The at least two strip-like electrodes include a first strip-like electrode and a second strip-like electrode.

The power supply module is configured to supply power to the first strip-like electrode and the second strip-like electrode such that a voltage is formed between the first strip-like electrode and the second strip-like electrode.

Optionally, a width of the first strip-like electrode is greater than a width of the second strip-like electrode, and a potential of the first strip-like electrode is higher than a potential of the second strip-like electrode.

Optionally, the at least two strip-like electrodes include multiple first strip-like electrodes and multiple second strip-like electrodes, and the multiple first strip-like electrodes and the multiple second strip-like electrodes are alternately arranged in the target direction.

Optionally, the multiple first strip-like electrodes are arranged at equal intervals, and the multiple second strip-like electrodes are arranged at equal intervals.

Optionally, the mist removing device further includes a control module, and the control module is configured to control the power supply module to apply the voltage between the first strip-like electrode and the second strip-like electrode.

Optionally, the control module is configured to control the power supply module to sequentially supply power to the multiple first strip-like electrodes in the target direction.

Optionally, a target surface of the substrate has a first region and a second region, the first region and the second region extend in the target direction, a height of the target surface gradually decreases in the target direction, and the target surface is a surface on which the electrode array is arranged.

The electrode array is within the first region.

Optionally, the mist removing device further includes a hydrophobic layer on a side of the insulating layer away from the substrate.

Optionally, the electrode array, the insulating layer and the hydrophobic layer each are a transparent structure.

Optionally, a material of the electrode array is indium tin oxide, a material of the insulating layer is methyl methacrylate, and a material of the hydrophobic layer is nanostructured glass.

Optionally, the electrode array includes at least two strip-like electrodes spaced apart from each other in a target direction, and a length extension direction of the strip-like electrode is perpendicular to the target direction.

The at least two strip-like electrodes include multiple first strip-like electrodes and multiple second strip-like electrodes; the multiple first strip-like electrodes and the multiple second strip-like electrodes are alternately arranged in the target direction, the multiple first strip-like electrodes are arranged at equal intervals, and the multiple second strip-like electrodes are arranged at equal intervals.

A width of the first strip-like electrode is greater than a width of the second strip-like electrode, and in a case that there is a voltage between the first strip-like electrode and the second strip-like electrode, a potential of the first strip-like electrode is higher than a potential of the second strip-like electrode.

Optionally, the substrate is a mirror, or, a windshield of a vehicle.

In another aspect, a mist removing system is provided, which includes a substrate and a mist removing device on at least one side of the substrate. The mist removing device includes the mist removing device according to any of the descriptions in the above aspect.

In another aspect, a method of controlling a mist removing device is provided, which is applied to controlling the mist removing device according any of the descriptions in the above aspect. The method includes:

controlling the power supply module to supply power to the electrode array such that the electrode array forms an electric field to cause droplets in a mist to converge under action of the electric field, where the mist is formed on the side of the insulating layer away from the substrate.

Optionally, the electrode array includes at least two strip-like electrodes spaced apart from each other in a target direction, and a length extension direction of the strip-like electrode is perpendicular to the target direction. The at least two strip-like electrodes include a first strip-like electrode and a second strip-like electrode. The controlling the power supply module to supply power to the electrode array includes:

controlling the power supply module to apply a voltage between the first strip-like electrode and the second strip-like electrode.

Optionally, the at least two strip-like electrodes includes multiple first strip-like electrodes and multiple second strip-like electrodes. The multiple first strip-like electrodes and the multiple second strip-like electrodes are alternately arranged in the target direction. The controlling the power supply module to apply a voltage between the first strip-like electrode and the second strip-like electrode includes:

controlling the power supply module to sequentially supply power to the multiple first strip-like electrodes in the target direction.

In another aspect, a control element is provided, which is applied to controlling the mist removing device according any of the descriptions in the above aspect. The control element includes: a memory and a processor.

The memory is configured to store a computer program.

The processor is configured to execute the computer program stored in the memory, to implement the method of controlling the mist removing device according to any of the descriptions in the above aspect.

In another aspect, a computer storage medium is provided, when a program in the computer storage medium is executed by a processor, the method of controlling the mist removing device according to any of the descriptions in the above aspect is implemented.

DETAILED DESCRIPTION

To better clarify objects, technical solutions and advantages of the present disclosure, detailed descriptions of the present disclosure are further provided in conjunction with the drawings hereinafter. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Figure 1:
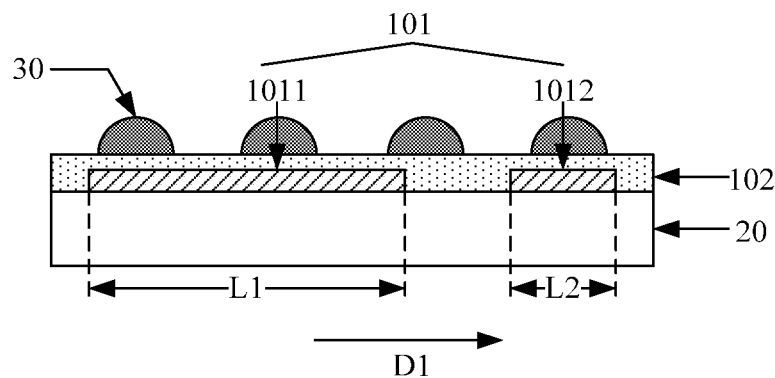
FIG. 1 is a schematic structural view of a mist removing device according to some embodiments of the present disclosure.

FIG. 1 is a schematic structural view of a mist removing device according to some embodiments of the present disclosure. As shown in FIG. 1, the mist removing device includes a power supply module (not shown in FIG. 1), an electrode array 101 and an insulating layer 102. The electrode array 101 and the insulating layer 102 are stacked on a substrate 20 in a direction away from the substrate 20. An orthographic projection of the insulating layer 102 onto the substrate 20 covers an orthographic projection of the electrode array 101 onto the substrate 20. The power supply module is connected with the electrode array 101.

It should be noted that the insulating layer has a function of protecting the electrode array. The insulating layer can isolate the droplets and prevent the droplets from directly contacting the electrode array. On the one hand, the droplets are prevented from corroding the electrode array. On the other hand, after the electrode array is powered, it can not only prevent the droplets from causing short circuit of the electrode array, but can also prevent an electrolytic reaction of the droplets.

The power supply module is configured to supply power to the electrode array 101 to enable the electrode array 101 to form an electric field, so as to cause droplets 30 in a mist to converge under action of the electric field, the mist being formed on a surface of the insulating layer 102 away from the substrate 20.

It should be noted that the mist formed on the surface of the insulating layer away from the substrate includes a large quantity of the droplets. When a droplet in the mist changes its position under action of the electric field, the droplet can achieve convergence with other droplets.

In summary, in the mist removing device provided by the embodiments of the present disclosure, the power supply module supplies power to the electrode array, such that the electrode array forms the electric field. When the mist is formed on the surface of the insulating layer away from the substrate, the positions of the droplets in the mist can be changed under the action of the electric field formed by the electrode array, thereby realizing convergence of the droplets. Therefore, the mist removing device can remove the mist formed on the surface of the insulating layer away from the substrate. When the substrate is a windshield of a vehicle, the mist can be prevented from affecting the transmittance of the windshield, thereby ensuring the sight line of the driver and reducing the safety risk.

Optionally, as shown in FIG. 1, the electrode array 101 includes at least two strip-like electrodes spaced apart from each other along a target direction D1, and a length extension direction of the strip-like electrode is perpendicular to the target direction D1. The at least two strip-like electrodes includes a first strip-like electrode 1011 and a second strip-like electrode 1012. The length extension direction of the strip-like electrode is perpendicular to the paper.

The power supply module is configured to supply power to the first strip-like electrode 1011 and the second strip-like electrode 1012 to enable a voltage to be formed between the first strip-like electrode 1011 and the second strip-like electrode 1012. Optionally, the voltage between the first strip-like electrode and the second strip-like electrode may be a positive voltage, that is, a potential of the first strip-like electrode is higher than a potential of the second strip-like electrode; or, the voltage between the first strip-like electrode and the second strip-like electrode may be a negative voltage, that is, the potential of the first strip-like electrode is lower than the potential of the second strip-like electrode.

Optionally, in the mist removing device shown in FIG. 1, in the case that the potential of the first strip-like electrode 1011 is higher than the potential of the second strip-like electrode 1012, a direction of the electric field formed is the same as the target direction D1. In the case that the potential of the first strip-like electrode 1011 is lower than the potential of the second strip-like electrode 1012, the direction of the electric field formed is opposite to the target direction D1. It should be noted that, under the action of the electric field, the droplets 30 move in a direction in which the strip-like electrode with a high potential in the electrode array 101 is located.

Optionally, as shown in FIG. 1, a width L1 of the first strip-like electrode 1011 is greater than a width L2 of the second strip-like electrode 1012, and the power supply module supplies power to the first strip-like electrode and the second strip-like electrode to enable the potential of the first strip-like electrode to be higher than the potential of the second strip-like electrode. Or, the width of the first strip-like electrode is smaller than the width of the second strip-like electrode, and the power supply module supplies power to the first strip-like electrode and the second strip-like electrode to enable the potential of the first strip-like electrode to be lower than the potential of the second strip-like electrode. Optionally, each of the width of the first strip-like electrode 1011 and the width of the second strip-like electrode 1012 may range from 10 micrometers to 100 micrometers.

It should be noted that, when the power supply module supplies power to the first strip-like electrode and the second strip-like electrode in the electrode array, the potential of the strip-like electrode having a larger width in the electrode array (such as the first strip-like electrode in FIG. 1) is enabled to be higher than the potential of the strip-like electrode having a smaller width in the electrode array (such as the second strip-like electrode in FIG. 1). The droplets move toward the strip-like electrode with the higher potential, and the higher potential is applied to the strip-like electrodes with the larger width, therefore, the strip-like electrode with the larger width can attract more droplets, thereby improving convergence effect of the electrode array on the droplets.

In the embodiments of the present disclosure, the case where all of the electrodes in the electrode array 101 are strip-like electrodes is merely taken as an example for description. Optionally, the electrodes in the electrode array may be electrodes with other shapes, for example, a block electrode or other special-shaped electrode (such as a wavelike electrode, etc.), which is not limited by the embodiments of the present disclosure.

Figure 2:
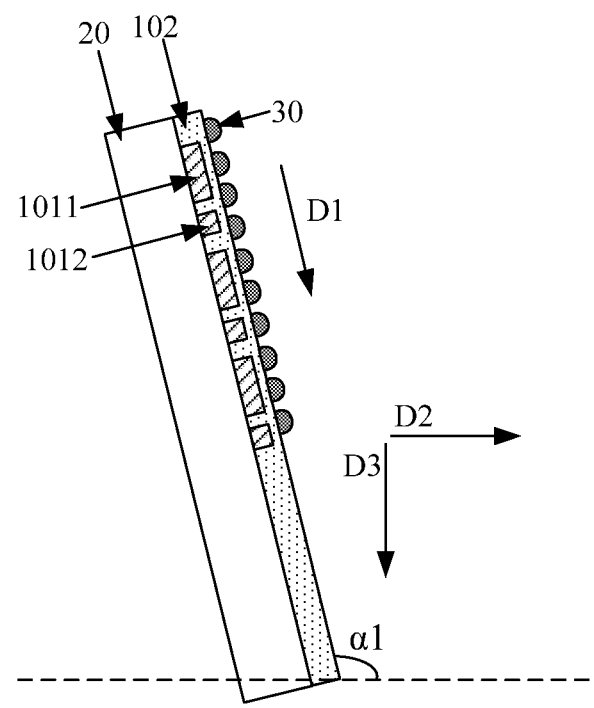
FIG. 2 is a schematic structural view of another mist removing device according to some embodiments of the present disclosure.

Optionally, FIG. 2 is a schematic structural view of another mist removing device according to some embodiments of the present disclosure. As shown in FIG. 2, the at least two strip-like electrodes include multiple first strip-like electrodes 1011 and multiple second strip-like electrodes 1012, and the multiple first strip-like electrodes 1011 and the multiple second strip-like electrodes 1012 are alternately arranged along the target direction D1. In FIG. 1, a case where the electrode array 101 includes three first strip-like electrodes 1011 and three second strip-like electrodes 1012 is taken as an example for description, which is not used to limit the number of strip-like electrodes in the electrode array, nor to limit whether the number of first strip-like electrodes is equal to the number of second strip-like electrodes or not. For example, the electrode array may include five first strip-like electrodes and four second strip-like electrodes, which is not limited in the embodiments of the present disclosure.

Optionally, in FIG. 2, the multiple first strip-like electrodes 1011 are arranged at equal intervals, and the multiple second strip-like electrodes 1012 are arranged at equal intervals. Optionally, the multiple strip-like electrodes in the electrode array are all evenly spaced. A distance between two adjacent strip-like electrodes may range from 5 micrometers to 50 micrometers. That is, the distance between the first strip-like electrode and the second strip-like electrode which are adjacent may range from 5 micrometers to 50 micrometers.

Figure 3:
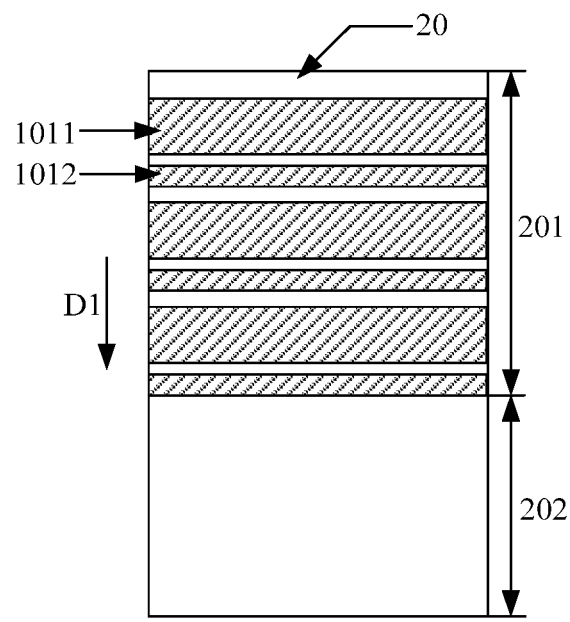
FIG. 3 is a side view of the mist removing device shown in FIG. 2.

FIG. 3 is a side view of the mist removing device shown in FIG. 2. In, FIG. 3 the insulating layer and the mist formed on the surface of the insulating layer away from the substrate are not shown. As shown in FIG. 3, a target surface of the substrate 20 has a first region 201 and a second region 202, and the first region 201 and the second region 202 are sequentially arranged along the target direction D1. That is, the target surface of the substrate 20 has the first region 201 and the second region 202, and the first region 201 and the second region 202 extend along the target direction D1. The electrode arrays 101 are each arranged within the first region 201. The target surface is a surface on which the electrode array 101 is arranged. As shown in FIG. 2, a height of the target surface gradually decreases along the target direction D1.

The height of the target surface gradually decreases along the target direction D1, that is, the target surface of the substrate 20 has an angle with respect to a horizontal plane, and the angle α1 between the target surface of the substrate 20 and the horizontal plane is greater than zero. In FIG. 2, the angle α1 between the target surface of the substrate 20 and the horizontal plane is an obtuse angle, and the target direction D1 is between a horizontal direction D2 and a gravity direction D3. Optionally, the angle between the target surface of the substrate and the horizontal plane may be a right angle, and the target direction is the gravity direction.

It should be noted that, the target surface of the substrate has the first region and the second region extending along the target direction, and the height of the target surface gradually decreases along the target direction, hence, in the case that the droplets in the first region converge into a relatively large droplet, the relatively large droplet will slide along the target direction to the second region under action of its own gravity and then gather with the droplets in the second region, thereby effectively removing the mist on the target surface.

Optionally, the target surface of the substrate 20 may be parallel to the horizontal plane, and the target direction is in the horizontal direction.

Figure 4:
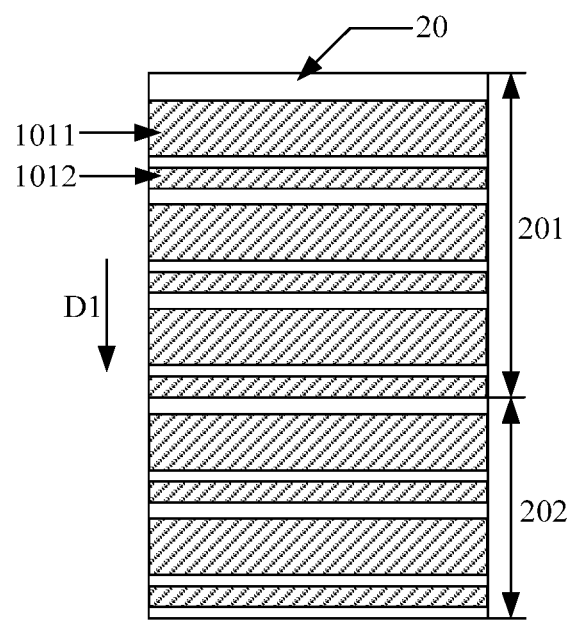
FIG. 4 is a schematic structural view of another mist removing device according to some embodiments of the present disclosure.

It should be noted that, in FIG. 3, the case where the electrode array 101 is arranged in the first region 201 is merely taken as an example for description. Optionally, FIG. 4 is a schematic structural view of another mist removing device according to some embodiments of the present disclosure. As shown in FIG. 4, the electrode array 101 may include multiple first strip-like electrodes 1011 and multiple second strip-like electrodes 1012 arranged in the first region 201 and the second region 202. A position of the electrode array is not limited in the embodiments of the present disclosure.

Optionally, the mist removing device provided by some embodiments of the present disclosure may further include a control module. The control module is configured to control the power supply module to apply the voltage between the first strip-like electrode and the second strip-like electrode.

In a practicable implementation, the control module is configured to control the power supply module to sequentially supply power to the multiple first strip-like electrodes along the target direction.

Illustratively, the control module may control the power supply module to sequentially supply power to the three first strip-like electrodes in FIG. 2 along the target direction. That is, the control module controls the power supply module to sequentially energize the three first strip-like electrodes, and when one of the first strip-like electrodes is energized, the other two first strip-like electrodes are powered off.

In another practicable implementation, the control module is configured to control the power supply module to sequentially supply power to the multiple second strip-like electrodes along the target direction.

Illustratively, the control module may control the power supply module to sequentially supply power to the three second strip-like electrodes in FIG. 2 along the target direction. That is, the control module controls the power supply module to sequentially energize the three second strip-like electrodes, and when one of the second strip-like electrodes is energized, the other two second strip-like electrodes are powered off.

It should be noted that, the control module controls the power supply module to sequentially supply power to the first strip-like electrodes and/or the second strip-like electrodes along the target direction, so that the multiple strip-like electrodes in the electrode array sequentially form an electric field along the target direction. In this way, the droplets in the mist formed on the surface of the insulating layer away from the substrate can move, converge and slide down along the target direction, thereby improving the effect of removing the mist on the surface of the insulating layer.

Figure 5:
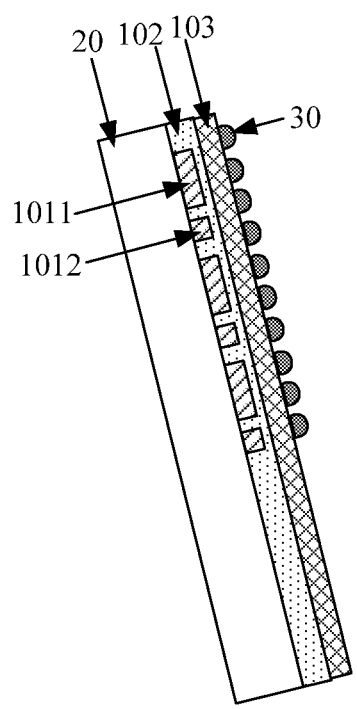
FIG. 5 is a schematic structural view of another mist removing device according to some embodiments of the present disclosure.

Optionally, FIG. 5 is a schematic structural view of another mist removing device according to some embodiments of the present disclosure. As shown in FIG. 5, the mist removing device may further include a hydrophobic layer 103 on a side of the insulating layer 102 away from the substrate 20.

It should be noted that, since the hydrophobic layer has hydrophobic property, a surface tension of the droplet on the hydrophobic layer is greater than a surface tension of the droplet on the insulating layer. When the mist is formed on the hydrophobic layer, the droplets in the mist are more likely to converge under the action of the electric field formed by the electrode array 101. Therefore, the arrangement of the hydrophobic layer on the side of the insulating layer away from the substrate can further improve the demisting effect of the mist removing device.

Optionally, the electrode array, the insulating layer and the hydrophobic layer in some embodiments of the present disclosure may all be transparent structures. Illustratively, a material of the electrode array may be indium tin oxide, a material of the insulating layer may be methyl methacrylate, and a material of the hydrophobic layer may be nanostructured glass. Optionally, the material of the electrode array may also be other transparent and conductive material, such as indium gallium zinc oxide. The material of the insulating layer may also be other transparent and insulating material, such as polyvinyl chloride. The material of the hydrophobic layer may also be other transparent and hydrophobic material, such as nanostructured plastic. The materials are not limited in the embodiments of the present disclosure.

Optionally, the substrate 20 may be a windshield (such as a front windshield) of a vehicle, or, a mirror (such as a rearview mirror of a vehicle). Or, the substrate may be a sightseeing glass or a cosmetic mirror, which is not limited in the embodiments of the present disclosure. In the case that the substrate is the mirror, the electrode array may be arranged on a mirror surface or a non-mirror surface of the mirror.

Illustratively, a demisting process of the mist removing device is described by taking the mist removing device shown in FIG. 5 as an example.

When the droplet 30 is located on the surface of the hydrophobic layer 103 away from the substrate 20, the droplet 30 has a contact angle with the hydrophobic layer 103. When the electric field is present adjacent to the droplet 30, the contact angle on a side of the droplet 30 close to on the electric field will be changed.

Figure 6:
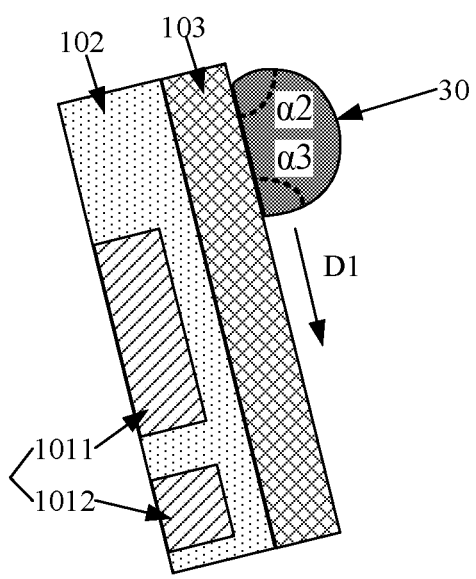
FIG. 6 is a schematic view of a droplet in an equilibrium state according to some embodiments of the present disclosure.

Illustratively, FIG. 6 is a schematic view of the droplet in an equilibrium state according to some embodiments of the present disclosure. As shown in FIG. 6, when the power supply module does not supply power to the electrode array 101, the droplet 30 is in the equilibrium state. The droplet 30 has a contact angle $\alpha 2$ and a contact angle $\alpha 3$ with the hydrophobic layer 103, and the contact angle $\alpha 3$ is close to the electrode array 101. A frictional force (not shown in FIG. 6) of the droplet 30 with the hydrophobic layer 103 and a component (not shown in FIG. 6) of a gravity of the droplet 30 in the target direction D1 are equal in magnitude and are opposite in direction.

Figure 7:
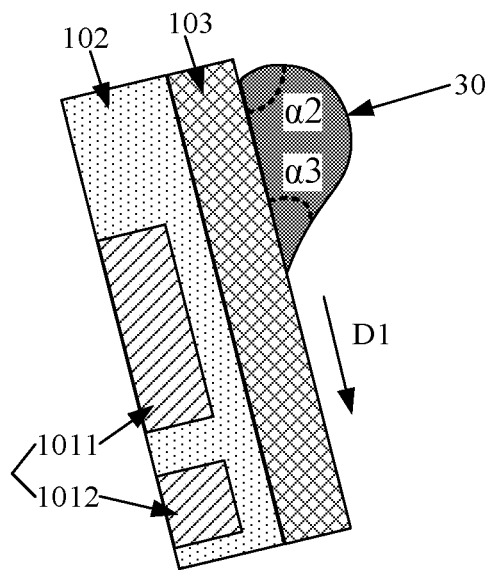
FIG. 7 is a schematic view of a droplet in a non-equilibrium state according to some embodiments of the present disclosure.

FIG. 7 is a schematic view of the droplet in a non-equilibrium state according to some embodiments of the present disclosure. As shown in FIG. 7, when the power supply module supplies power to the electrode array 101 and the electrode array 101 forms the electric field, the droplet 30 is in the non-equilibrium state. The contact angle $\alpha 3$ of the droplet 30 and the hydrophobic layer 103 becomes smaller under the action of the electric field, and the droplet 30 has a tendency to move along the target direction D1. The larger the intensity of the electric field is, the larger the attraction force (not shown in FIG. 6) of the electric field to the droplet 30 is, and the smaller the contact angle $\alpha 3$ is. When the intensity of the electric field is greater than a target field intensity so as to enable the attraction force of the electric field to the droplet 30 to be greater than a target attraction force, a resultant force of the attraction force and the component of the gravity of the droplet 30 in the target direction D1 is greater than the frictional force of the droplet with the hydrophobic layer, so that the droplet 30 moves along the target direction D1 (a moving state of the droplet 30 is not shown in either of FIGS. 6 and 7). It should be noted that, under the action of the electric field, the effect of changing of the contact angle of the droplet 30 with respect to the hydrophobic layer 103 is the electrowetting effect.

Figure 8:
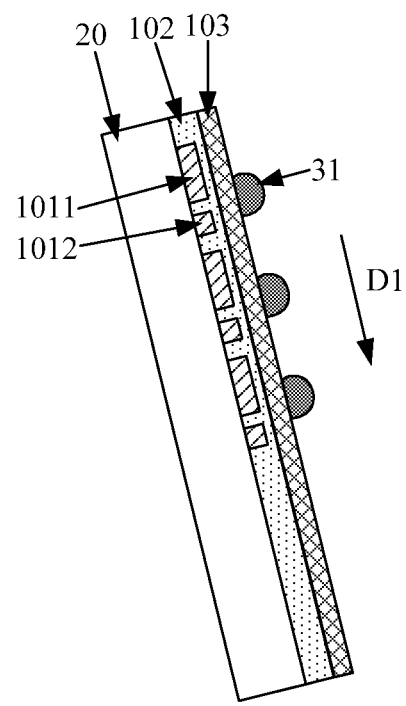
FIG. 8 is a schematic view of a large droplet formed on an insulating layer according to some embodiments of the present disclosure.
Figure 9:
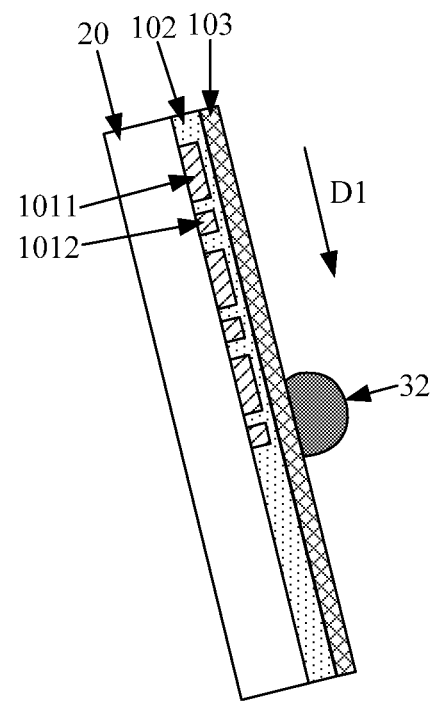
FIG. 9 is a schematic view of another large droplet formed on an insulating layer according to some embodiments of the present disclosure.

Optionally, FIG. 8 and FIG. 9 each are a schematic view of a large droplet formed on the insulating layer according to some embodiments of the present disclosure. When multiple droplets 30 as shown in FIG. 5 are formed on the side of the insulating layer 102 away from the substrate 20, the power supply module may energize the electrode array to enable the electrode array 101 to form the electric field, thereby enabling the multiple droplets to move and converge under the action of the electric field. In this way, multiple large droplets 31 as shown in FIG. 8 are formed, thereby removing the mist. Or, the control module may control the power supply module to sequentially apply voltage to the first strip-like electrodes 1011 and/or the second strip-like electrodes 1012 along the target direction D1, to enable the electrode array to sequentially form the electric field along the target direction D1, thereby enabling, the multiple droplets 30 to move and converge in the target direction D1. In this way, a large droplet 32 as shown in FIG. 9 is formed, and the large droplet 32 slides down along the target direction D1 under the action of its own gravity (the state in which the large droplet 32 slides down is not shown in FIG. 9), thereby removing the mist.

Figure 10:
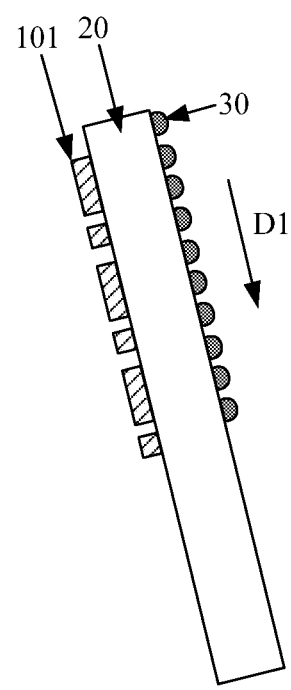
FIG. 10 is a schematic structural view of another mist removing device according to some embodiments of the present disclosure.

In the embodiments of the present disclosure, the case where the mist removing device includes the electrode array and the insulating layer and the electrode array and the insulating layer are located on the same side of the substrate is taken as an example for description. FIG. 10 is a schematic structural view of another mist removing device according to some embodiments of the present disclosure. As shown in FIG. 10, in the mist removing device, the electrode array 101 may be arranged on a side of the substrate 20 where the mist is not formed, which is not limited in the embodiments of the present disclosure.

In summary, in the mist removing device provided by the embodiments of the present disclosure, the power supply module supplies power to the electrode array, such that the electrode array forms the electric field. When the mist is formed on the surface of the insulating layer away from the substrate, the positions of the droplets in the mist can be changed under the action of the electric field formed by the electrode array, thereby realizing convergence of the droplets. Therefore, the mist removing device can remove the mist formed on the surface of the insulating layer away from the substrate. When the substrate is a windshield of a vehicle, the mist can be prevented from affecting the transmittance of the windshield, thereby ensuring the sight line of the driver and reducing the safety risk.

A mist removing system is provided by some embodiments of the present disclosure, which includes a substrate and a mist removing device located on at least one side of the substrate. The mist removing device may be the mist removing device as shown in any one of FIGS. 1 to 5 and 10.

Optionally, when the substrate is a windshield of a vehicle, the mist removing device may be provided on each of two sides of the windshield of the vehicle, to achieve effective demisting of the inner and outer sides of the windshield of the vehicle.

Essentially, the mist removing system may be the windshield of the vehicle having an automatic demisting function or a mirror having the automatic demisting function, or the like, which is not limited in the embodiments of the present disclosure.

A method of controlling a mist removing device is provided by some embodiments of the present disclosure. The method of controlling the mist removing device may be applied to controlling the mist removing device as shown in any one of FIGS. 1 to 5 and 10. The method of controlling the mist removing device may include the following operating process:

controlling the power supply module to supply power to the electrode array such that the electrode array forms the electric field to cause droplets in the mist to converge under the action of the electric field, where the mist is formed on the side of the insulating layer away from the substrate.

Optionally, as shown in FIG. 1 or FIG. 2, the electrode array includes at least two strip-like electrodes spaced apart from each other along a target direction, and a length extension direction of the strip-like electrode is perpendicular to the target direction. The controlling the power supply module to supply power to the electrode array may include: controlling the power supply module to apply a voltage between the first strip-like electrode and the second strip-like electrode.

Optionally, the at least two strip-like electrodes include multiple first strip-like electrodes and multiple second strip-like electrodes. The multiple first strip-like electrodes and the multiple second strip-like electrodes are alternately arranged along the target direction. The power supply module may be controlled to sequentially supply power to the multiple first strip-like electrodes and/or the multiple second strip-like electrodes along the target direction.

It should be noted that the control module controls the power supply module to sequentially supply power to the first strip-like electrodes and/or the second strip-like electrodes along the target direction, so that the multiple strip-like electrodes in the electrode array can sequentially form the electric field along the target direction. In this way, the droplets in the mist formed on the surface of the insulating layer away from the substrate can move, converge and slide down along the target direction, thereby improving the effect of removing the mist on the surface of the insulating layer.

In summary, in the method of controlling the mist removing device provided by the embodiments of the present disclosure, the power supply module is controlled to supply power to the electrode array, such that the electrode array forms the electric field. When the mist is formed on the surface of the insulating layer away from the substrate, the positions of the droplets in the mist can be changed under the action of the electric field formed by the electrode array, thereby realizing convergence of the droplets. Therefore, the mist removing device can remove the mist formed on the surface of the insulating layer away from the substrate. When the substrate is a windshield of a vehicle, the mist can be prevented from affecting the transmittance of the windshield, thereby ensuring the sight line of the driver and reducing the safety risk.

It should be noted that, for the method embodiments provided by the embodiments of the present disclosure and the corresponding device embodiments, reference can be made to each other, which is not limited in the embodiments of the present disclosure. The sequence of steps in the method embodiments provided by the embodiments of the present disclosure can be appropriately adjusted. The steps can be increased or decreased accordingly based on situations. Any modified method that can be easily conceived by those skilled in the art within the technical scope disclosed in the present disclosure should fall within the protection scope of the present disclosure, which is not described herein.

Figure 11:
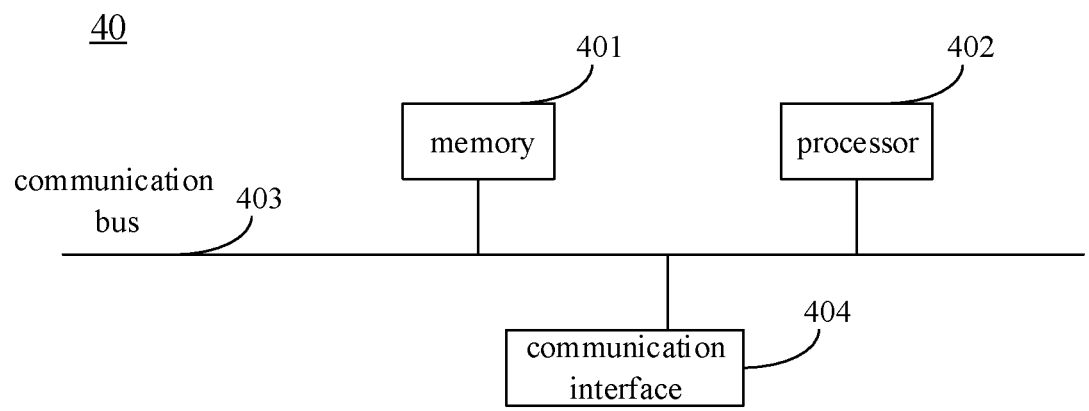
FIG. 11 is a schematic structural view of a control element according to some embodiments of the present disclosure.

A control element is provided by some embodiments of the present disclosure, which is applied to controlling the mist removing device as shown is any one of FIGS. 1 to 5 and 10. As shown in FIG. 11, the control element 40 includes: a memory 401 and a processor 402.

The memory 401 is configured to store a computer program.

The processor 402 is configured to execute the program stored in the memory 401 to implement a controlling method of an integrated imaging display system as shown in FIG. 12.

Optionally, the control element 40 further includes a communication bus 403 and a communication interface 404.

The processor 402 includes one or more processing cores. The processor 402 executes various functional applications and data processing by running computer programs and units.

The memory 401 may be configured to store the computer programs and the units. Specifically, the memory may store an operating system and an application unit required for at least one function. The operating system may be, for example, Real Time eXecutive (RTX), LINUX, UNIX, WINDOWS, or OS X.

The number of the communication interface 404 may be more than one. The communication interface 404 is configured to communicate with other storage devices or network devices. For example, in some embodiments of the present disclosure, the communication interface 404 may be configured to send control instructions to a display device and/or a polarization conversion element.

The memory 401 and the communication interface 404 are respectively coupled to the processor 402 via the communication bus 403.

A computer storage medium is provided by some embodiments of the present disclosure. When a program in the storage medium is executed by a processor, the method of controlling the mist removing device as described in the method embodiments can be implemented.

Optionally, the computer storage medium may be a storage medium in the control element (chip).

After consideration of the specification and practice of the invention disclosed herein, those skilled in the art can readily appreciate other embodiments of the present disclosure. The present disclosure is intended to cover any variations, uses or adaptations of the present disclosure. These variations, uses or adaptations follow the general principles of the present disclosure and include common general knowledge or conventional techniques in the art that are not provided by the present disclosure. The description and the embodiments are for illustrative purpose only. The actual scope and concept of the present disclosure are indicated by the claims.

It should be understood that the present disclosure is not limited to the precise structures that have been described above and illustrated in the drawings. Various modifications and changes can be made without departing from the scope of the present disclosure. The scope of the present disclosure is to be limited only by the appended claims.

What is claimed is:

1. A mist removing device, comprising:
   a power supply module, an electrode array and an insulating layer, wherein the electrode array and the insulating layer are arranged on a substrate in a stacked manner in a direction away from the substrate, an orthographic projection of the insulating layer onto the substrate covers an orthographic projection of the electrode array onto the substrate, and the power supply module is connected with the electrode array;
   wherein the power supply module is configured to supply power to the electrode array such that the electrode array forms an electric field to cause droplets in a mist to converge under action of the electric field, and wherein the mist is formed on a side of the insulating layer away from the substrate;
   wherein the electrode array comprises at least two strip-like electrodes spaced apart from each other in a target direction, a length extension direction of the strip-like electrode is perpendicular to the target direction, and the at least two strip-like electrodes comprise a first strip-like electrode and a second strip-like electrode;
   wherein the power supply module is configured to supply power to the first strip-like electrode and the second strip-like electrode such that a voltage is formed between the first strip-like electrode and the second strip-like electrode;
   wherein a width of the first strip-like electrode is greater than a width of the second strip-like electrode, and a potential of the first strip-like electrode is higher than a potential of the second strip-like electrode.

2. The mist removing device according to claim 1, wherein the at least two strip-like electrodes comprise a plurality of first strip-like electrodes and a plurality of second strip-like electrodes, and the plurality of first strip-like electrodes and the plurality of second strip-like electrodes are alternately arranged in the target direction.

3. The mist removing device according to claim 2, wherein the plurality of first strip-like electrodes is arranged at equal intervals, and the plurality of second strip-like electrodes is arranged at equal intervals.

4. The mist removing device according to claim 2, further comprising a control module, wherein the control module is configured to control the power supply module to apply the voltage between the first strip-like electrode and the second strip-like electrode.

5. The mist removing device according to claim 4, wherein the control module is configured to control the power supply module to sequentially supply power to the plurality of first strip-like electrodes in the target direction.

6. The mist removing device according to claim 1, wherein a target surface of the substrate has a first region and a second region, the first region and the second region extend in the target direction, a height of the target surface gradually decreases in the target direction, and the target surface is a surface on which the electrode array is arranged; and
   wherein the electrode array is within the first region.

7. The mist removing device according to claim 1, further comprising a hydrophobic layer on a side of the insulating layer away from the substrate.

8. The mist removing device according to claim 7, wherein the electrode array, the insulating layer and the hydrophobic layer each are a transparent structure.

9. The mist removing device according to claim 8, wherein a material of the electrode array is indium tin oxide, a material of the insulating layer is methyl methacrylate, and a material of the hydrophobic layer is nanostructured glass.

10. The mist removing device according to claim 1, wherein the substrate is a mirror, or, a windshield of a vehicle.

11. A mist removing system, comprising: a substrate and a mist removing device on at least one side of the substrate, wherein the mist removing device comprises the mist removing device according to claim 1.

12. A method of controlling a mist removing device, applied to controlling the mist removing device according to claim 1, wherein the method comprises:
   controlling the power supply module to supply power to the electrode array such that the electrode array forms an electric field to cause droplets in a mist to converge under action of the electric field, wherein the mist is formed on the side of the insulating layer away from the substrate.

13. The method according to claim 12, wherein the controlling the power supply module to supply power to the electrode array comprises:

controlling the power supply module to apply a voltage between the first strip-like electrode and the second strip-like electrode.

14. The method according to claim 13, wherein the at least two strip-like electrodes comprises a plurality of first strip-like electrodes and a plurality of second strip-like electrodes, the plurality of first strip-like electrodes and the plurality of second strip-like electrodes are alternately arranged in the target direction, and the controlling the power supply module to apply a voltage between the first strip-like electrode and the second strip-like electrode comprises:

controlling the power supply module to sequentially supply power to the plurality of first strip-like electrodes in the target direction.

15. A control element, applied to controlling the mist removing device according to claim 1, wherein the control element comprises: a memory and a processor;

wherein the memory is configured to store a computer program; and wherein the processor is configured to execute the computer program stored in the memory, to implement the following steps:

controlling the power supply module to supply power to the electrode array such that the electrode array forms an electric field to cause droplets in a mist to converge under action of the electric field, wherein the mist is formed on the side of the insulating layer away from the substrate.

16. A non-transitory computer storage medium, wherein, when a program in the computer storage medium is executed by a processor, the method according to claim 12 is implemented.

17. The mist removing device according to claim 2, further comprising a hydrophobic layer on a side of the insulating layer away from the substrate.

18. The mist removing system according to claim 11, wherein the at least two strip-like electrodes comprise a plurality of first strip-like electrodes and a plurality of second strip-like electrodes, and the plurality of first strip-like electrodes and the plurality of second strip-like electrodes are alternately arranged in the target direction.

19. The mist removing system according to claim 18, wherein the plurality of first strip-like electrodes is arranged at equal intervals, and the plurality of second strip-like electrodes is arranged at equal intervals.

20. The mist removing system according to claim 18, wherein the mist removing device further comprises a control module, wherein the control module is configured to control the power supply module to apply the voltage between the first strip-like electrode and the second strip-like electrode.

* * * * *